United States Patent
Schmöller et al.

(10) Patent No.: US 9,234,734 B2
(45) Date of Patent: Jan. 12, 2016

(54) LENGTH MEASURING INSTRUMENT

(71) Applicant: Dr. Johannes Heidenhain GmbH, Traunreut (DE)

(72) Inventors: Markus Schmöller, Traunstein (DE); Michael Steber, Ruhpolding (DE)

(73) Assignee: DR. JOHNANNES HEIDENHAIN GMBH, Traunreut (DE)

( * ) Notice: Subject to any disclaimer, the term of this patent is extended or adjusted under 35 U.S.C. 154(b) by 436 days.

(21) Appl. No.: 13/778,659

(22) Filed: Feb. 27, 2013

(65) Prior Publication Data
US 2013/0227852 A1 Sep. 5, 2013

(30) Foreign Application Priority Data

Mar. 1, 2012 (DE) .......... 10 2012 203 193

(51) Int. Cl.
  *G01B 5/02* (2006.01)
  *G01B 11/02* (2006.01)
  *G01D 11/26* (2006.01)
  *G01D 5/347* (2006.01)
  *G01B 11/14* (2006.01)
  *G01B 7/14* (2006.01)

(52) U.S. Cl.
  CPC .............. *G01B 5/02* (2013.01); *G01D 5/34769* (2013.01); *G01B 7/14* (2013.01); *G01B 11/02* (2013.01); *G01B 11/14* (2013.01); *G01D 5/347* (2013.01); *G01D 5/34761* (2013.01); *G01D 11/26* (2013.01)

(58) Field of Classification Search
  CPC ............ G01B 11/02; G01B 5/02; G01B 7/14; G01B 11/14; G01D 11/26; G01D 5/34769; G01D 5/34761; G01D 5/347

USPC .......... 33/700, 702–703, 705–708, 783–784, 33/791–792, 1 M, 1 PT
See application file for complete search history.

(56) References Cited

U.S. PATENT DOCUMENTS

| | | | | |
|---|---|---|---|---|
| 3,579,836 A | * | 5/1971 | Kraus et al. ..................... | 33/1 R |
| 4,070,759 A | * | 1/1978 | Nelle ............................. | 33/705 |
| 4,295,742 A | * | 10/1981 | Nelle et al. ..................... | 356/619 |
| 4,320,578 A | * | 3/1982 | Ernst .............................. | 33/702 |
| 4,509,262 A | * | 4/1985 | Nelle ............................. | 33/707 |
| 4,580,346 A | * | 4/1986 | Reichl ........................... | 33/705 |

(Continued)

FOREIGN PATENT DOCUMENTS

DE  34 12 879 A1  11/1985
EP  0 418 212 A2   8/1990

*Primary Examiner* — R. A. Smith
*Assistant Examiner* — Tania Courson
(74) *Attorney, Agent, or Firm* — Brinks Gilson & Lione

(57) ABSTRACT

A length measuring instrument including a hollow profile section extending in a longitudinal direction and an end piece fixed on the hollow profile section for closure of the hollow profile section on an end of the hollow profile section. A scale is disposed inside the hollow profile section, wherein the scale includes a measurement graduation which can be scanned by a scanning unit that is movable in the longitudinal direction relative to the hollow profile section. The length measuring instrument includes a sealing element on the end piece for sealing off the hollow profile section, wherein the sealing element has a cross-section that is at least extensively equivalent to an inside diameter of the hollow profile section. In addition, the sealing element rests sealingly so that a circumferential surface of the sealing element is on an inner face of the hollow profile section.

10 Claims, 8 Drawing Sheets

(56) References Cited

U.S. PATENT DOCUMENTS

| | | | | |
|---|---|---|---|---|
| 4,609,819 A | * | 9/1986 | Miller | 250/237 G |
| 4,649,648 A | * | 3/1987 | Nagaoka et al. | 33/700 |
| 4,982,508 A | * | 1/1991 | Nelle et al. | 33/702 |
| 5,079,850 A | | 1/1992 | Rieder et al. | |
| 5,258,931 A | * | 11/1993 | Hassler, Jr. | 702/105 |
| 5,586,771 A | * | 12/1996 | Koskinen | 277/431 |
| 5,655,311 A | * | 8/1997 | Affa | 33/706 |
| 5,832,616 A | * | 11/1998 | Fiedler | 33/706 |
| 6,612,047 B1 | * | 9/2003 | Mazgaj et al. | 33/706 |
| 6,739,067 B2 | * | 5/2004 | Muller | 33/703 |
| 6,826,847 B2 | * | 12/2004 | Wahl et al. | 33/706 |
| 7,596,880 B2 | * | 10/2009 | Martin et al. | 33/707 |
| 7,788,821 B2 | * | 9/2010 | Affa et al. | 33/706 |
| 8,234,792 B2 | * | 8/2012 | Schenk et al. | 33/706 |
| 8,448,347 B2 | * | 5/2013 | Affa et al. | 33/706 |
| 8,997,367 B2 | * | 4/2015 | Schmoller et al. | 33/706 |
| 2003/0200671 A1 | * | 10/2003 | Muller | 33/706 |
| 2005/0046413 A1 | * | 3/2005 | Schmidt et al. | 324/164 |
| 2007/0056181 A1 | * | 3/2007 | Martin et al. | 33/707 |
| 2011/0072676 A1 | * | 3/2011 | Schenk et al. | 33/707 |

* cited by examiner

LENGTH MEASURING INSTRUMENT

RELATED APPLICATIONS

Applicants claim, under 35 U.S.C. §119, the benefit of priority of the filing date of Mar. 1, 2012 of a German patent application, copy attached, Serial Number 10 2012 203 193.6, filed on the aforementioned date, the entire contents of which is incorporated herein by reference.

BACKGROUND

1. Technical Field

The present invention relates to a length measuring instrument.

2. Background Information

One such length measuring instrument is described for instance in European Patent Disclosure 0 418 212 A2. Such length measuring instruments are known as encapsulated length measuring instruments, and they serve to measure the position of two objects that are displaceable relative to one another. Encapsulated length measuring instruments are used especially in machining machines for measuring the relative motion of a tool relative to a workpiece that is to be machined.

The length measuring instrument known from European Patent Disclosure 0 418 212 A2 includes a hollow profile section, which protects a scale secured inside it from environmental factors. The face ends of the hollow profile section are each closed with an end piece, which is also embodied for mounting the hollow profile section on one of the objects to be measured. The end piece has an insert part, with which it plunges into the inside of the opening in the hollow profile section. A seal disposed on the end piece effects sealing between the end piece and the hollow profile section. For receiving the seal, there is a groove in the insert part.

Instead of a seal acting along the circumference, the concept of a butt seal is also employed in length measuring instruments. One example is found in German Patent Disclosure DE 34 12 879 A1. There, the face end of a hollow profile section that has a scale is closed by an end piece, and a seal is inserted between the face end of the hollow profile section and the end piece placed onto it.

OBJECTS AND SUMMARY OF THE INVENTION

It is an object of the present invention to create a length measuring instrument which can be sealed off simply and effectively on its end and with which replicable position measurement is made possible.

This object is attained by a length measuring instrument including a hollow profile section extending in a longitudinal direction and an end piece fixed on the hollow profile section for closure of the hollow profile section on an end of the hollow profile section. The length measuring instrument includes a scale disposed inside the hollow profile section, wherein the scale includes a measurement graduation which for position measurement can be scanned by a scanning unit that is movable in the longitudinal direction relative to the hollow profile section. The length measuring instrument further includes a sealing element on the end piece for sealing off the hollow profile section on the end of the hollow profile section, wherein the sealing element has a cross-section that is at least extensively equivalent to an inside diameter of the hollow profile section. In addition, the sealing element rests sealingly so that a circumferential surface of the sealing element is on an inner face of the hollow profile section.

According to the present invention, a length measuring instrument includes a hollow profile section, extending in a longitudinal direction, in the interior of which a scale with a measurement graduation is disposed. At least one face end of the hollow profile section is closed with an end piece, which is fixed in stationary fashion on the hollow profile section. The end piece has a sealing element for sealing off the hollow profile section. This sealing element rests sealingly with its circumferential surface on the inside of the hollow profile section. The cross-section of the sealing element is at least extensively equivalent to the cross-section of the face-end opening of the hollow profile section. That is, the sealing element is embodied such that it fills and spans the inside diameter of the hollow profile section, and in particular, it has a plate-like shape. This has the advantage that the sealing element must provide sealing only on faces of the hollow profile section, and for sealing off the interior, it is not absolutely necessary to seal off the end piece from the sealing element.

For simple orientation of the end piece relative to the hollow profile section, the end piece has an insertion region with which it plunges into the interior of the hollow profile section. The sealing element is disposed on the end of the insertion region that points into the hollow profile section.

It is advantageous if the sealing element is attached to the end piece in such a way that it is displaceable or shiftable relative to the end piece transversely to the longitudinal direction of the hollow profile section. On the one hand, the displaceability allows mounting the sealing element on the end piece by slipping the sealing element onto the end piece, thus enabling easy preassembly of the unit including the end piece and the sealing element. On the other hand, the shiftability in the form of floating support of the sealing element relative to the end piece transversely to the longitudinal direction also ensures that the sealing element centers itself in the hollow profile section automatically, in all installation positions of the end piece. As a result, on the one hand, good sealing is ensured, and, on the other hand, the measurement accuracy of the length measuring instrument is not adversely affected either, since the sealing element does not exert any impermissible forces on the hollow profile section that has the scale. Since the sealing element spans the inside diameter of the hollow profile section and is mounted on the end piece so as to be movably transversely to the longitudinal direction, the sealing element, when a laterally acting force is exerted on it, is forced against the opposed face of the hollow profile section, thus ensuring self-centering.

Secure sealing and self-centering are ensured particularly if the sealing element is embodied of a relatively resilient material, which thus conforms well to other shapes only in those regions that act sealingly with respect to the inner faces of the hollow profile section. The middle region of the sealing element, which fills the inside diameter of the hollow profile section, is conversely made from a less resilient material.

In an especially preferred way, the end piece is embodied not only for closing off the face end of the hollow profile section, but also for mounting the hollow profile section on one of the objects to be measured. For that purpose, the end piece can have a bore for receiving a screw or bolt, by which the end piece, with the hollow profile section secured to it, is supported. Instead of the bore, angle pieces, bolts or balls, with which the hollow profile section can be secured to the object to be measured, may be disposed on the end piece in a known manner.

If the length measuring instrument is used in a hostile environment, excessive pressure is generated in the interior of the hollow profile section. To make this possible, a compressed air connection is provided on the end piece, and by way of the compressed air connection, compressed air can be delivered into the interior of the hollow profile section.

The sealing element is advantageously disposed and embodied such that the compressed air introduced by the compressed air connection arrives at the sealing element and is deflected there. The deflected compressed air arrives at an outlet opening of the sealing element, wherein the outlet opening points into the interior of the hollow profile section. Preferably, between the location where the introduced compressed air arrives from the compressed air connection and the outlet opening, the sealing element has a guide conduit for the compressed air.

Further advantages and details of the present invention will become apparent from the ensuing description of exemplary embodiments in conjunction with the drawings.

DETAILED DESCRIPTION OF THE PREFERRED EMBODIMENTS

Figure 1:
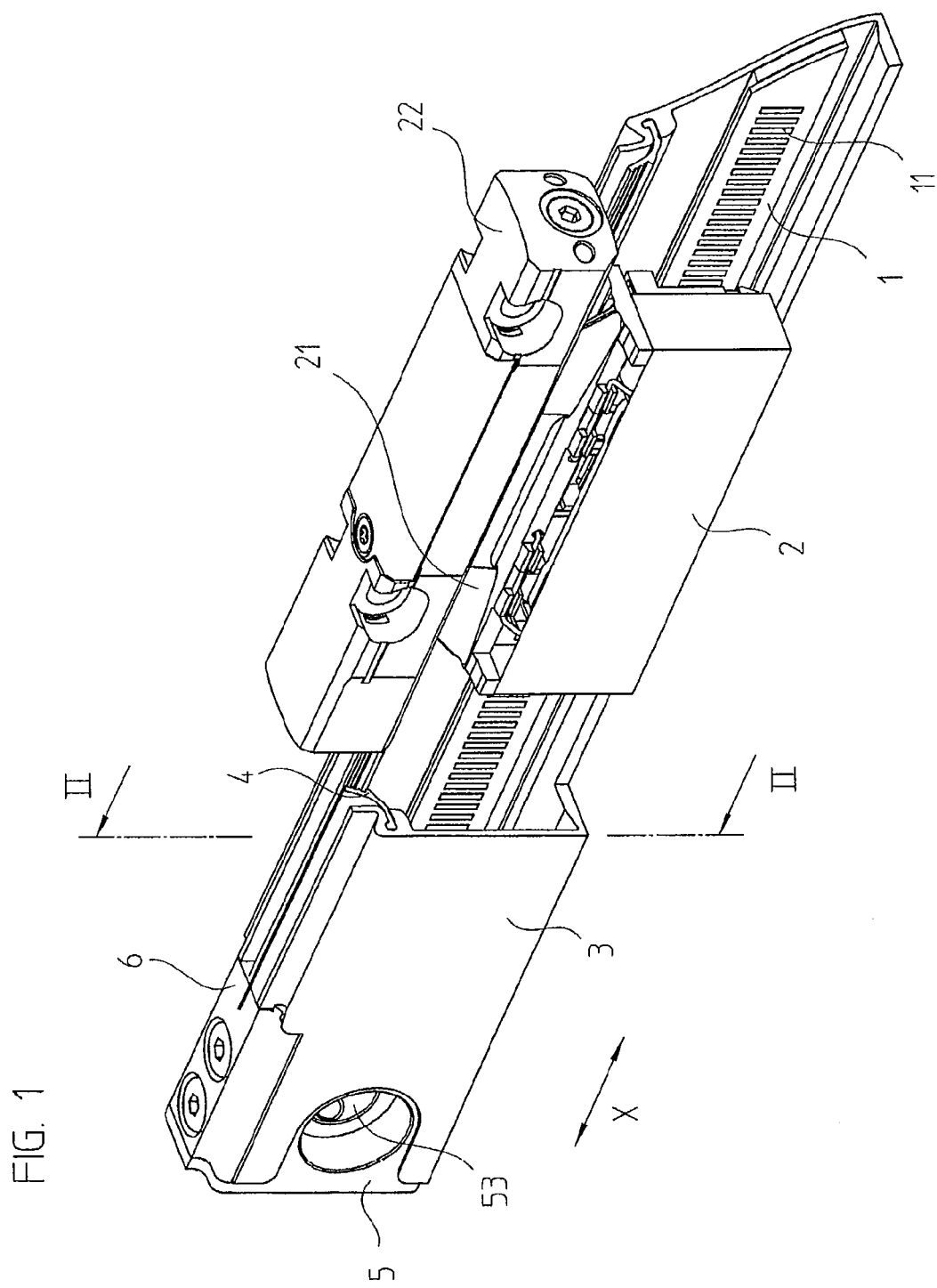
FIG. 1 shows an embodiment of a length measuring instrument in fragmentary section in accordance with the present invention.

The present invention will be described in detail in terms of a photoelectric length measuring instrument. This length measuring instrument includes two components, a scale 1 and a scanning unit 2, that are movable relative to one another in the longitudinal direction X. For measuring a position of two objects displaceable relative to one another in the longitudinal direction X, the scale 1 is secured to one of these objects, and the scanning unit 2 is secured to the other of these objects. During position measurement, the scanning unit 2 scans a measurement graduation 11 of the scale 1 and forms position measurement values from this. The measurement graduation 11 may be embodied as an incremental track with a succession of uniformly spaced markings, as a multi-track absolute track, or as a single-track absolute track with absolute coding disposed in succession in the longitudinal direction X, also known as pseudo-random coding. The present invention is not limited to the photoelectric scanning principle; the measurement graduation can also be designed to be scannable inductively, magnetically, or capacitively.

The scale 1 is accommodated in protected fashion in a hollow profile section 3 extending in the longitudinal direction X. The scale 1 is secured to the hollow profile section 3 by being fixed, for instance, to the inner side of one leg of the U-shaped hollow profile section 3, in particular by an adhesive. The hollow profile section 3 has a slot-like opening, extending in the longitudinal direction X, which is covered by gable-shaped sealing lips 4. Protruding through the sealing lips 4 is a sword-shaped driver 21, to which the scanning unit 2 is secured. A mounting element 22 is disposed on the driver 21 outside the hollow profile section 3 and is designed to be secured to one of the two objects to be measured, for instance by being screwed to it.

The two face ends of the hollow profile section 3 are each closed off with a respective end piece 5, only one of which is shown. The end piece 5 is fixed in stationary fashion on the hollow profile section 3. In the exemplary embodiment shown, the fixation of the end piece 5 on the hollow profile section 3 is effected by a clamping piece 6. The clamping piece 6 is screwed to the end piece 5. As a result of such screwing, a force is exerted on a portion 31 of the hollow profile section 3 disposed between the clamping piece 6 and the end piece 5. Such a force connects the portion 31 of the hollow profile section 3 and, thus, the hollow profile section 3 itself, to the end piece 5 in stationary fashion. The portion 31 is shown in FIG. 6.

The end piece 5 is embodied for mounting on one of the two objects to be measured. For that purpose, the end piece 5 has a bore 53 for a securing screw or for a bolt as shown in FIG. 1.

Figure 6:
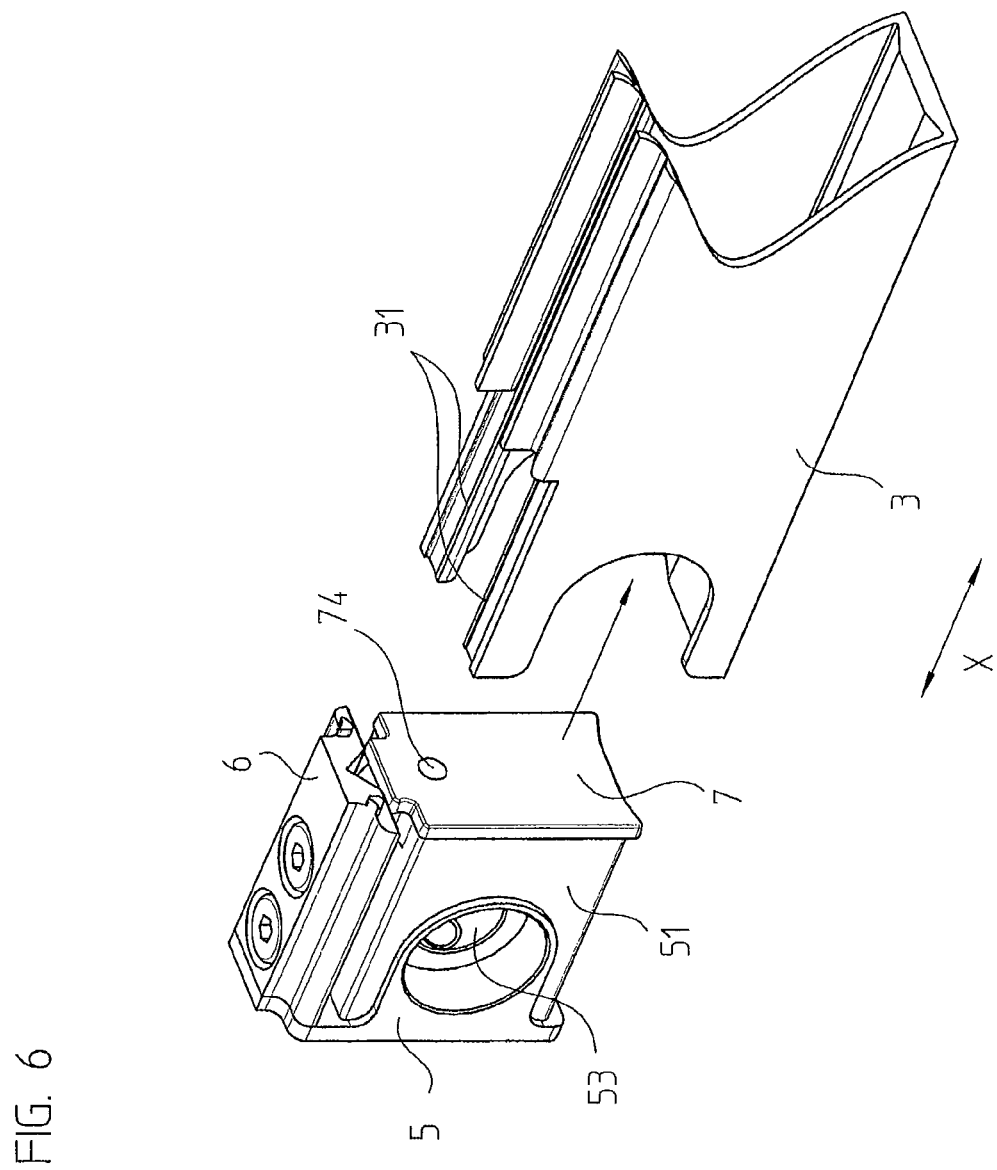
FIG. 6 shows the end piece of FIG. 5 with the sealing element of FIG. 3 on being mounted on a hollow profile section.

As shown in FIG. 6, a sealing element 7, which seals off the face end of the hollow profile section 3, is disposed on the end piece 5. The end piece 5 has an insertion region 51, with which the end piece 5 plunges into the interior of the hollow profile section 3. The sealing element 7 is disposed on the end of the insertion region 51 of the end piece 5 that points into the hollow profile section 3. As seen particularly from FIG. 2, the sealing element 7 is embodied in plate-like fashion and rests sealingly with its circumferential surface 71 on the inside 32 of the hollow profile section 3.

The hollow profile section 3 is U-shaped and has two parallel-extending legs and a base that joins the two legs. The slot-like opening is disposed facing the bottom and is bounded by two protrusions that are integrally formed onto the legs of the hollow profile section 3. The cross-section of the insertion region 51 of the end piece 5 is adapted to the cross-section of the hollow profile section 3 such that the inner faces of the two legs, of the base, and of the protrusions rest on side faces of the insertion region 51. The location of the end piece 5 transversely to the longitudinal direction X is thus predetermined by positive engagement by the inner faces of the hollow profile section 3.

Figure 3:
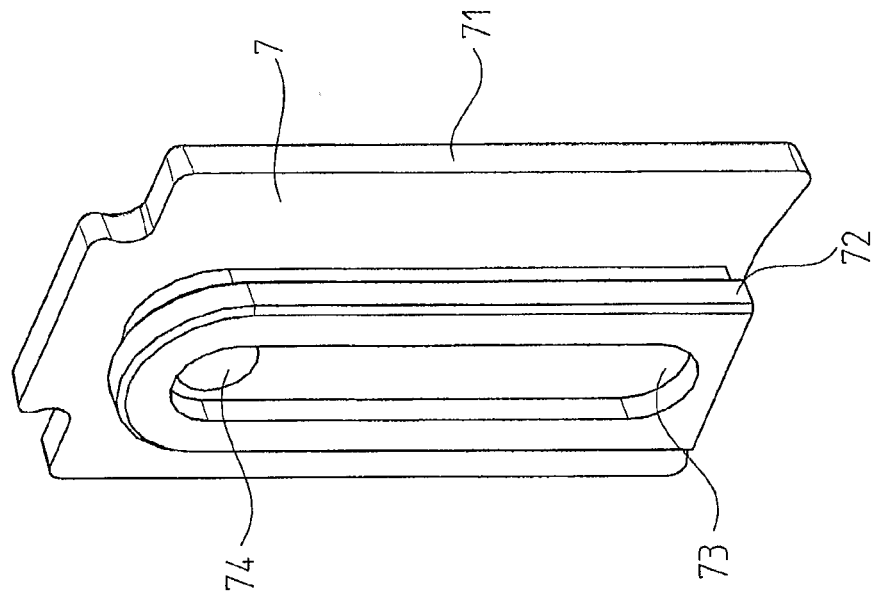
FIG. 3 is a perspective view of an embodiment of a sealing element to be used with the length measuring instrument of FIG. 1 in accordance with the present invention.
Figure 4:
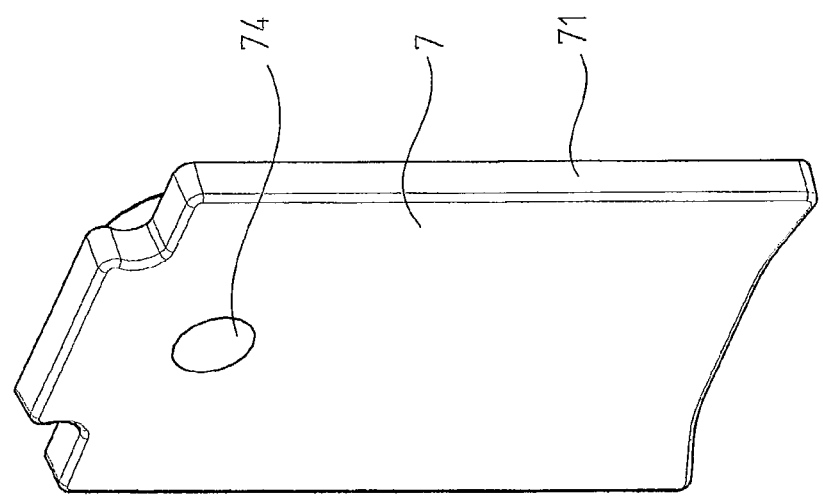
FIG. 4 shows the sealing elements of FIG. 3 in a further perspective view.
Figure 5:
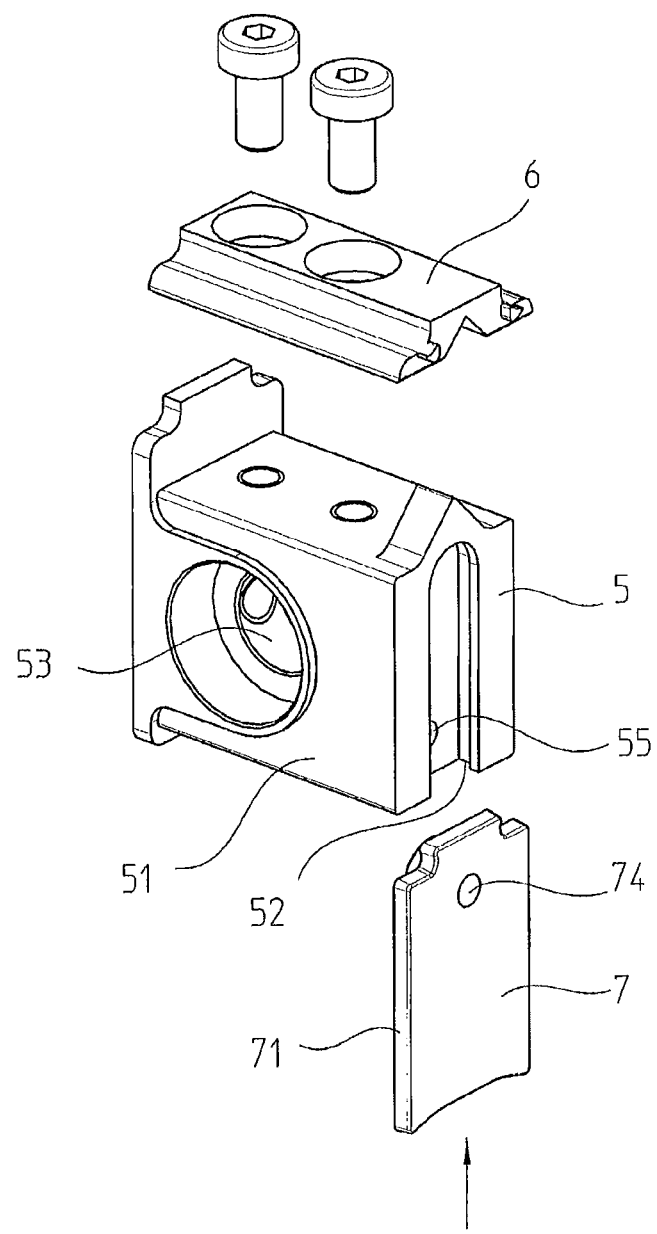
FIG. 5 shows an embodiment of an end piece of the length-measuring instrument of FIG. 1 as the sealing element of FIG. 3 is being installed in accordance with the present invention.

In FIGS. 3 and 4, the sealing element 7 is shown in perspective. FIG. 3 shows the side pointing into the interior of the hollow profile section 3, and FIG. 4 shows the side pointing in the direction of the end piece 5. The sealing element 7 is mounted on the end piece 5 in such a way that it is displaceable relative to the end piece 5 transversely to the longitudinal direction X. For that purpose, the end piece 5 and the sealing element 7, on opposed faces, have corresponding connecting elements 52 and 72, which, on the one hand, fix the sealing element to the end piece in the longitudinal direction X and, on the other hand, allow displaceability of the sealing element 7 transversely thereto. In the exemplary embodiment, the connecting element 52 provided on the end piece 5 is a T-slot, which is engaged by a T-shaped protrusion, as the connecting element 72 of the sealing element 7. The two connecting elements 52 and 72, or, in other words, the T-slot and the T-shaped protrusion, form a guide acting transversely to the longitudinal direction X. This guide serves the purpose of simple mounting of the sealing element 7 on the end piece 5, as shown in FIG. 5. Mounting the sealing element 7 on the end piece 5 is effected by inserting the T-shaped protrusion of the sealing element 7 into the T-slot of the end piece 5 in the direction of the arrow.

Figure 2:
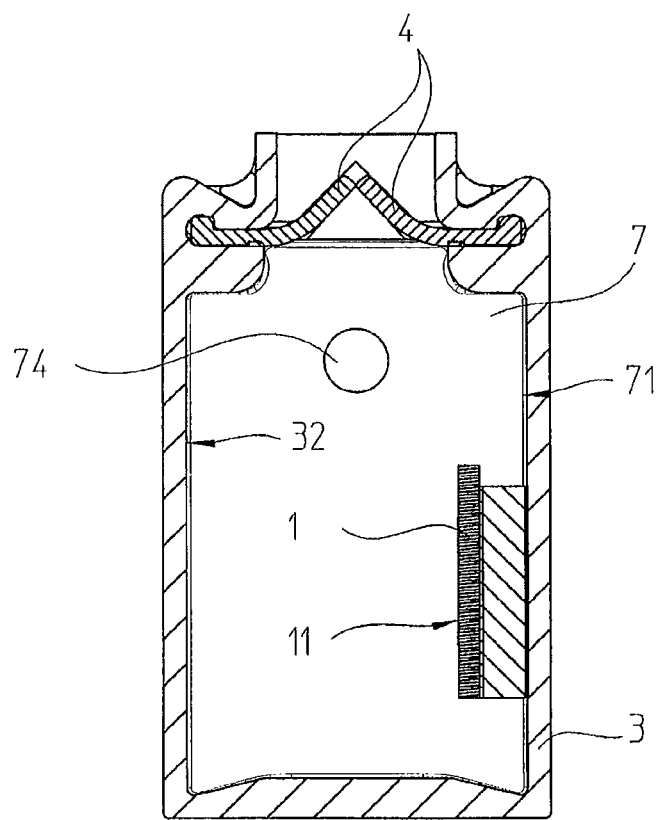
FIG. 2 is a cross-section II-II through the length-measuring instrument of FIG. 1.

In FIG. 6, to make the present invention even clearer, a further assembly state is shown. The insertion region 51 of the end piece 5 is thrust, with the sealing element 7 mounted on it, in the longitudinal direction X into the face-end opening of the hollow profile section 3, and the end piece 5 is fixed in stationary fashion on the hollow profile section 3, for instance by the clamping piece 6. As already discussed and as shown in FIG. 2, the sealing element 7 is plate-like and has an outer contour which is adapted to the inner contour of the hollow profile section 3 in such a way that with its circumferential surface 71 it rests sealingly on the inside 32 of the hollow profile section 3. The sealing element 7 is mounted on the end piece 5 in such a way that even during the assembly of the end piece 5 on the hollow profile section 3 it is supported on the end piece displaceably transversely to the longitudinal direction X relative to the end piece 5. Accordingly, the sealing element 7 adapts optimally to the actual location and the dimensions of the inner contour of the hollow profile section 3, as if it were floating there. The plate-like embodiment of the sealing element 7 and the floating disposition on the end on the end piece 5 have the advantage that assembly and production tolerances do not adversely affect the tightness.

As shown in FIG. 2, the hollow profile section 3 has a rectangular cross-section, specifically with a base, to which the protrusions and the slot covered by the sealing lips 4 face, and with two side walls opposite one another. The plate-like shape of the sealing element 7 corresponds to the inner contour of the hollow profile section 3, or to the cross-section of the hollow profile section 3. The location of the insertion region 51 of the end piece 5 in the hollow profile section 3 transversely to the longitudinal direction X is also dependent on the machining precision of the faces of the insertion region 51, which on being inserted correspond to the inner contour of the hollow profile section 3. As a result of the floating support of the sealing element 7 on the end piece 5, the location of the sealing element 7 transversely to the longitudinal direction X is not determined by the location of the insertion region 51. Because of the respective circumferential surfaces 71 of the sealing element 7 face one another and cooperate with inner sides 32 of the hollow profile section 3 that face one another, the sealing element 7 centers itself automatically in the hollow profile section 3 in such a way that optimal sealing on all sides is accomplished. The connection between the end piece 5 and the sealing element 7 enables a compensatory motion, which in this example amounts to about 0.5 mm, of the sealing element 7 in directions transverse to the longitudinal direction X relative to the end piece 5.

The self-centering function of the plate-like sealing element 7 also has a particular advantage if the mounting of the hollow profile section 3 by the end piece 5 takes place on one of the objects to be measured. Specifically, as a result of the securing of the end piece 5 to the object to be measured, the location of the end piece 5 relative to the hollow profile section 3 can vary. Because of the floating support of the sealing element 7 on the end piece 5, this shifting has no effect on the sealing action.

Figure 7:
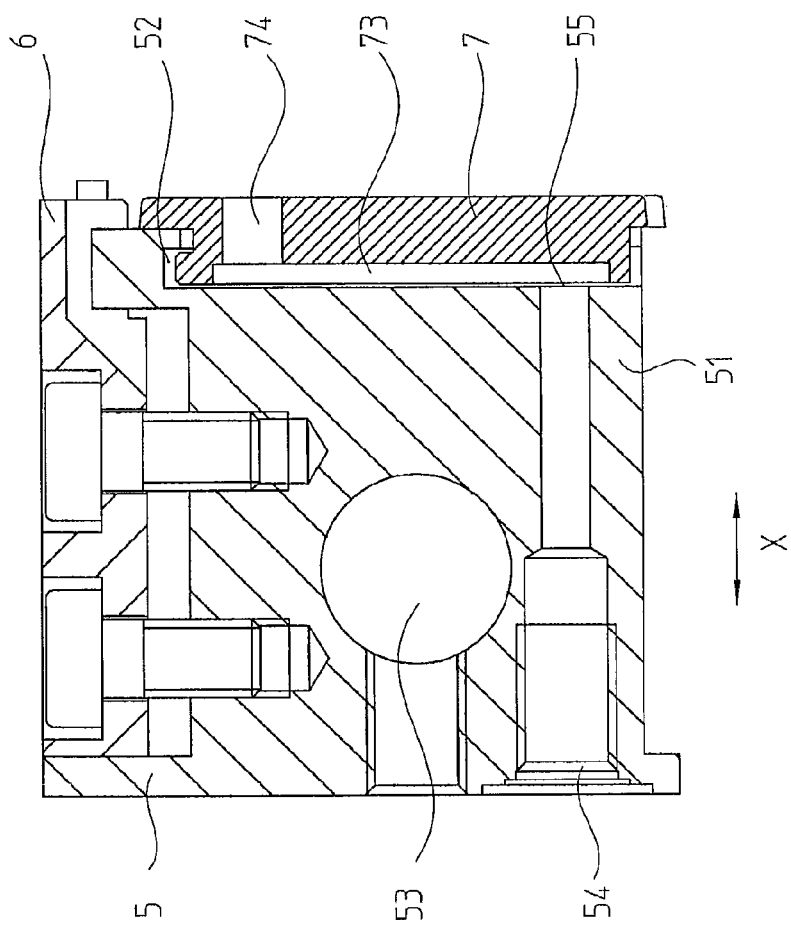
FIG. 7 shows the end piece of FIG. 5 with the sealing element of FIG. 3 in cross-section.

Encapsulated length measuring instruments are often used in machine tools that are used for metal-cutting machining of workpieces. To prevent cooling fluids or chips from penetrating into the interior of the length-measuring instrument, an excessive pressure is generated in the interior of the hollow profile section 3. For that purpose, a compressed air connection 54 is provided on the end piece 5 to enable connection to a compressed air source. This compressed air connection 54 and its construction described below are shown in FIG. 7. The compressed air introduced into the end piece 5 emerges again at an outlet opening 55 of the end piece 5. The plate-like sealing element 7 is now disposed and embodied such that the compressed air, initially introduced by the compressed air connection 54, arrives at the sealing element 7. The sealing element 7 thus has a face which acts as an impact face for the introduced compressed air. The sealing element 7 furthermore has an outlet opening 74, pointing into the interior of the hollow profile section 3, for the compressed air. Between the outlet opening 55 of the end piece 5 and the outlet opening 74 of the sealing element 7, the sealing element 7 has a guide conduit 73 for the compressed air. Thus, the outlet opening 55 is offset, transversely to the longitudinal direction X, from the outlet opening 74.

Figure 9:
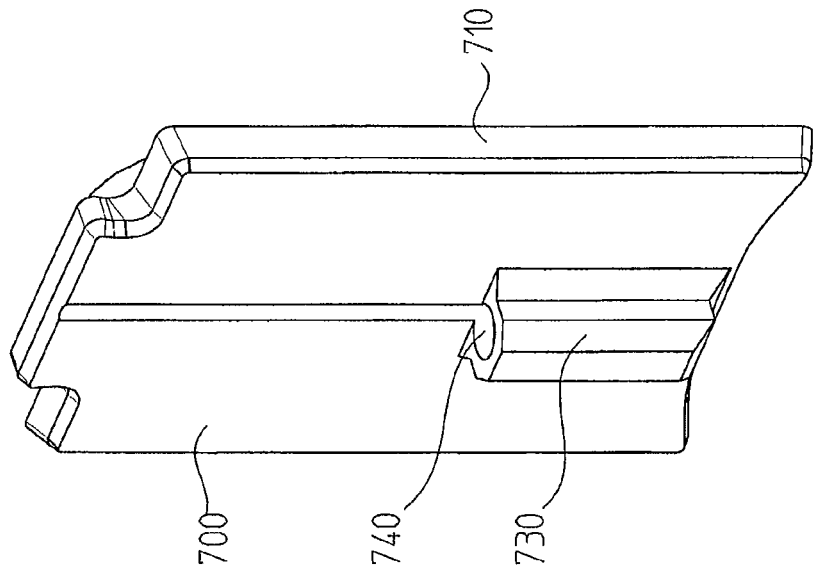
FIG. 9 shows a further view of the sealing element of FIG. 8.
Figure 8:
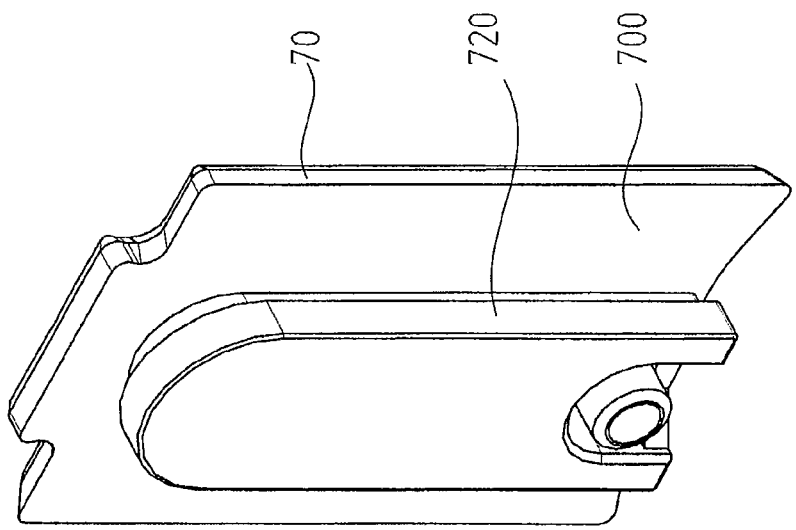
FIG. 8 is a perspective view of a further embodiment of a sealing element in accordance with the present invention.
Figure 10:
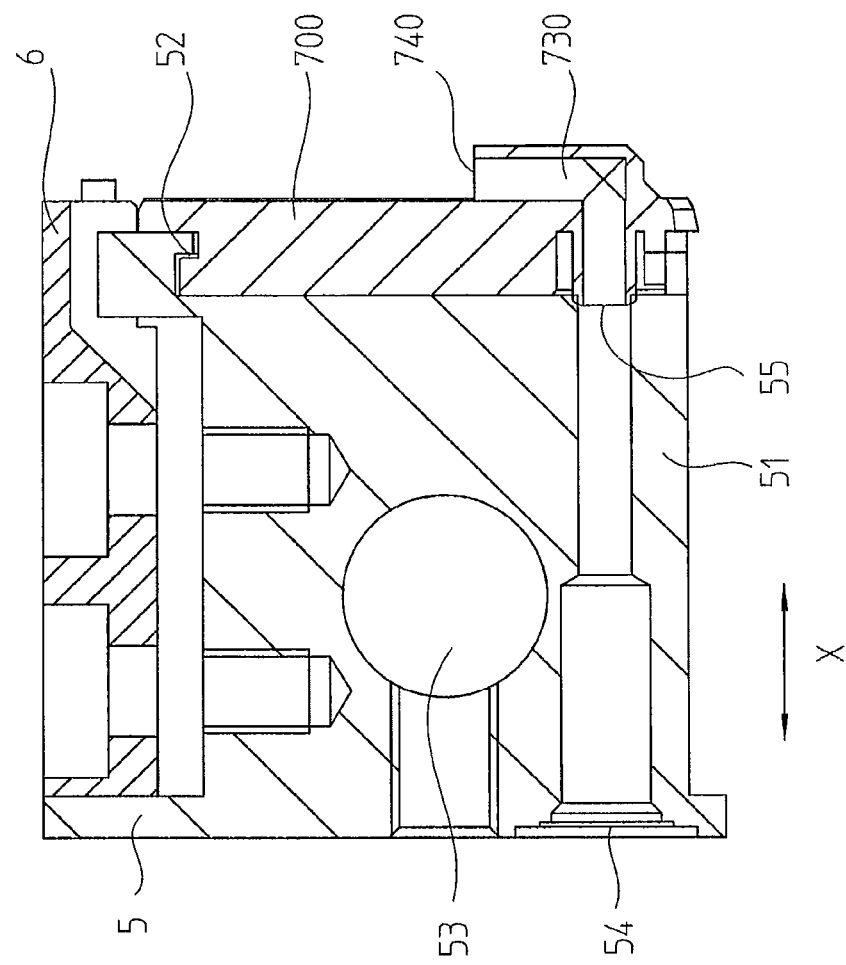
FIG. 10 shows an embodiment of an end piece with the sealing element of FIGS. 8 and 9 in cross-section.

FIGS. 8-10 show a second exemplary embodiment of a sealing element 700. As in the first exemplary embodiment, this sealing element 700 is plate-like and with its circumferential surface 710 on the inside 32 of the hollow profile section 3 it seals off the face end of the hollow profile section 3. The sealing element 700 moreover has a connecting element 720, to enable it to be secured to the end piece 5 in such a way that, on the one hand, it is fixed thereon in stationary fashion in the longitudinal direction X, and, on the other hand, it makes compensatory motions transversely to the longitudinal direction X possible. Unlike in the first exemplary embodiment, a guide conduit 730 for compressed air is provided on the sealing element 700 on the side pointing into the interior of the hollow profile section 3, and the guide conduit 730 ends at an outlet opening 740 which directs the compressed air, introduced into the interior of the hollow profile section 3, in the direction of the sealing lips 4 as shown in FIG. 10.

As the material for the sealing element 7, 700, an elastomer such as NBR, EPDM or ACM is especially suitable. The connecting element 72, 720 and the guide conduit 73, 730 are preferably formed integrally onto the plate-like sealing element 7, 700 by injection molding.

For good sealing, at least the circumferential surface 71, 710 of the sealing element 7, 700 pointing toward the inside 32 of the hollow profile section 3 includes a soft plastic, in particular an elastomer, that conforms especially well to what it is pressed against. The sealing element 7, 700 may include a single material and in particular can be produced from elastomer as an injection-molded part. Alternatively, the sealing element 7, 700 could include two different materials, namely a soft material for sealing purposes and a harder material not needed for sealing purposes. The production can be done in a two-component injection molding process, in which the region of the sealing element 7,700 not used for sealing purposes is made from a harder material, for instance a thermoplastic such as polypropylene.

The foregoing description is provided to illustrate the present invention, and is not to be construed as a limitation. Numerous additions, substitutions and other changes can be made to the invention without departing from its scope as set forth in the appended claims.

We claim:

1. A length measuring instrument, comprising:
a hollow profile section extending in a longitudinal direction;

an end piece fixed on said hollow profile section for closure of said hollow profile section on an end of said hollow profile section;
a scale disposed inside said hollow profile section, wherein said scale comprises a measurement graduation which for position measurement can be scanned by a scanning unit that is movable in said longitudinal direction relative to said hollow profile section; and
a sealing element on said end piece for sealing off said hollow profile section on said end of said hollow profile section, wherein said sealing element has a cross-section that is at least extensively equivalent to an inside diameter of said hollow profile section and said sealing element rests sealingly so that a circumferential surface of said sealing element is on an inner face of said hollow profile section, wherein said sealing element is attached to said end piece in such a way that said sealing element is displaceable relative to said end piece transversely to said longitudinal direction.

2. The length measuring instrument according to claim 1, wherein said end piece comprises a first connecting element and said sealing element comprises a second connecting element, wherein said first connecting element and said second connecting element together form a guide to connect said sealing element to said end piece by slipping said sealing element onto said guide in a direction transverse to said longitudinal direction.

3. A length measuring instrument, comprising:
a hollow profile section extending in a longitudinal direction;
an end piece fixed on said hollow profile section for closure of said hollow profile section on an end of said hollow profile section, wherein said end piece comprises a compressed air connection that delivers compressed air into an interior of said hollow profile section;
a scale disposed inside said hollow profile section, wherein said scale comprises a measurement graduation which for position measurement can be scanned by a scanning unit that is movable in said longitudinal direction relative to said hollow profile section; and
a sealing element on said end piece for sealing off said hollow profile section on said end of said hollow profile section, wherein said sealing element has a cross-section that is at least extensively equivalent to an inside diameter of said hollow profile section and said sealing element rests sealingly so that a circumferential surface of said sealing element is on an inner face of said hollow profile section.

4. The length measuring instrument according to claim 3, wherein said sealing element is disposed and embodied such that said compressed air delivered by said compressed air connection arrives at said sealing element and is deflected, and wherein said sealing element has an outlet opening for said compressed air which points into said interior of said hollow profile section.

5. The length measuring instrument according to claim 4, wherein said sealing element, between said location where said compressed air arrives from said compressed air connection and said outlet opening, comprises a guide conduit for said compressed air.

6. A length measuring system, comprising:
a scanning unit; and
a length measuring instrument comprising:
a hollow profile section extending in a longitudinal direction;
an end piece fixed on said hollow profile section for closure of said hollow profile section on an end of said hollow profile section;
a scale disposed inside said hollow profile section, wherein said scale comprises a measurement graduation that is scanned by said scanning unit, which is movable in said longitudinal direction relative to said hollow profile section; and
a sealing element on said end piece for sealing off said hollow profile section on said end of said hollow profile section, wherein said sealing element has a cross-section that is at least extensively equivalent to an inside diameter of said hollow profile section and said sealing element rests sealingly so that a circumferential surface of said sealing element is on an inner face of said hollow profile section, wherein said sealing element is attached to said end piece in such a way that said sealing element is displaceable relative to said end piece transversely to said longitudinal direction.

7. The length measuring system according to claim 6, wherein said end piece comprises a first connecting element and said sealing element comprises a second connecting element, wherein said first connecting element and said second connecting element together form a guide to connect said sealing element to said end piece by slipping said sealing element onto said guide in a direction transverse to said longitudinal direction.

8. A length measuring system, comprising:
a scanning unit; and
a length measuring instrument comprising:
a hollow profile section extending in a longitudinal direction;
an end piece fixed on said hollow profile section for closure of said hollow profile section on an end of said hollow profile section, wherein said end piece comprises a compressed air connection that delivers compressed air into an interior of said hollow profile section;
a scale disposed inside said hollow profile section, wherein said scale comprises a measurement graduation that is scanned by said scanning unit, which is movable in said longitudinal direction relative to said hollow profile section; and
a sealing element on said end piece for sealing off said hollow profile section on said end of said hollow profile section, wherein said sealing element has a cross-section that is at least extensively equivalent to an inside diameter of said hollow profile section and said sealing element rests sealingly so that a circumferential surface of said sealing element is on an inner face of said hollow profile section.

9. The length measuring system according to claim 8, wherein said sealing element is disposed and embodied such that said compressed air delivered by said compressed air connection arrives at said sealing element and is deflected, and wherein said sealing element has an outlet opening for said compressed air which points into said interior of said hollow profile section.

10. The length measuring system according to claim 9, wherein said sealing element, between said location where said compressed air arrives from said compressed air connection and said outlet opening, comprises a guide conduit for said compressed air.

* * * * *